Oct. 20, 1970   H. F. WUÉNSCHER   3,534,926
SPACE MANUFACTURING MACHINE
Filed April 28, 1969                                                 2 Sheets-Sheet 2
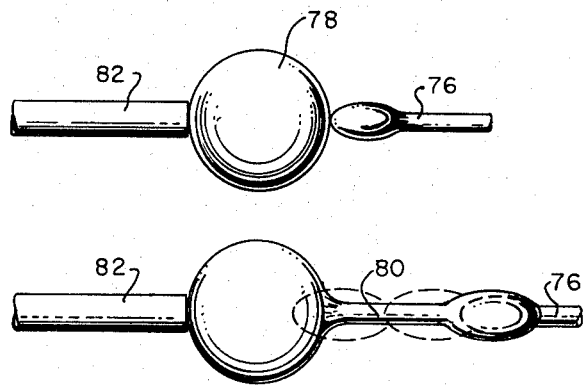
FIG. 7
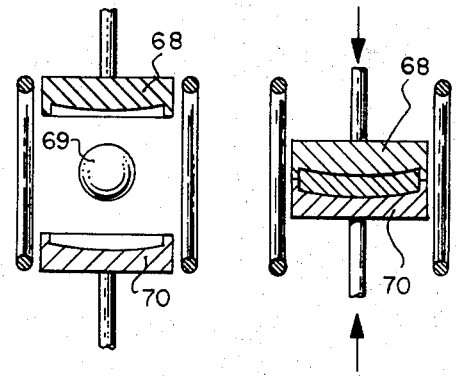
FIG. 6
FIG. 5
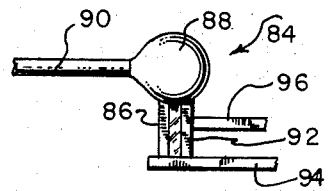
FIG. 8
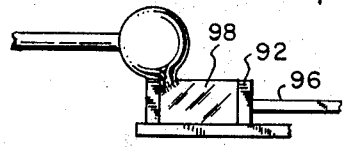
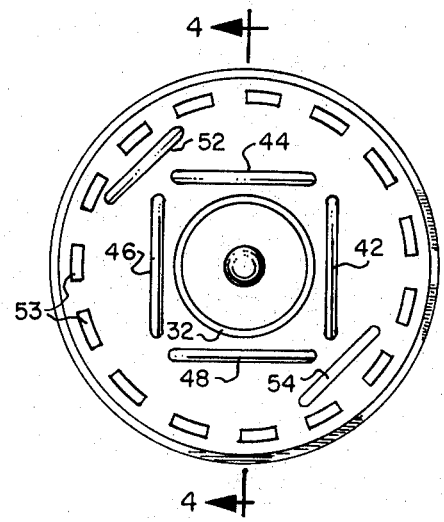
FIG. 3                FIG. 4
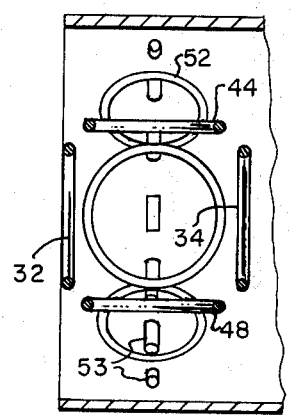
FIG. 9
INVENTOR
HANS F. WUENSCHER
BY
Charles C. Wells
ATTORNEYS

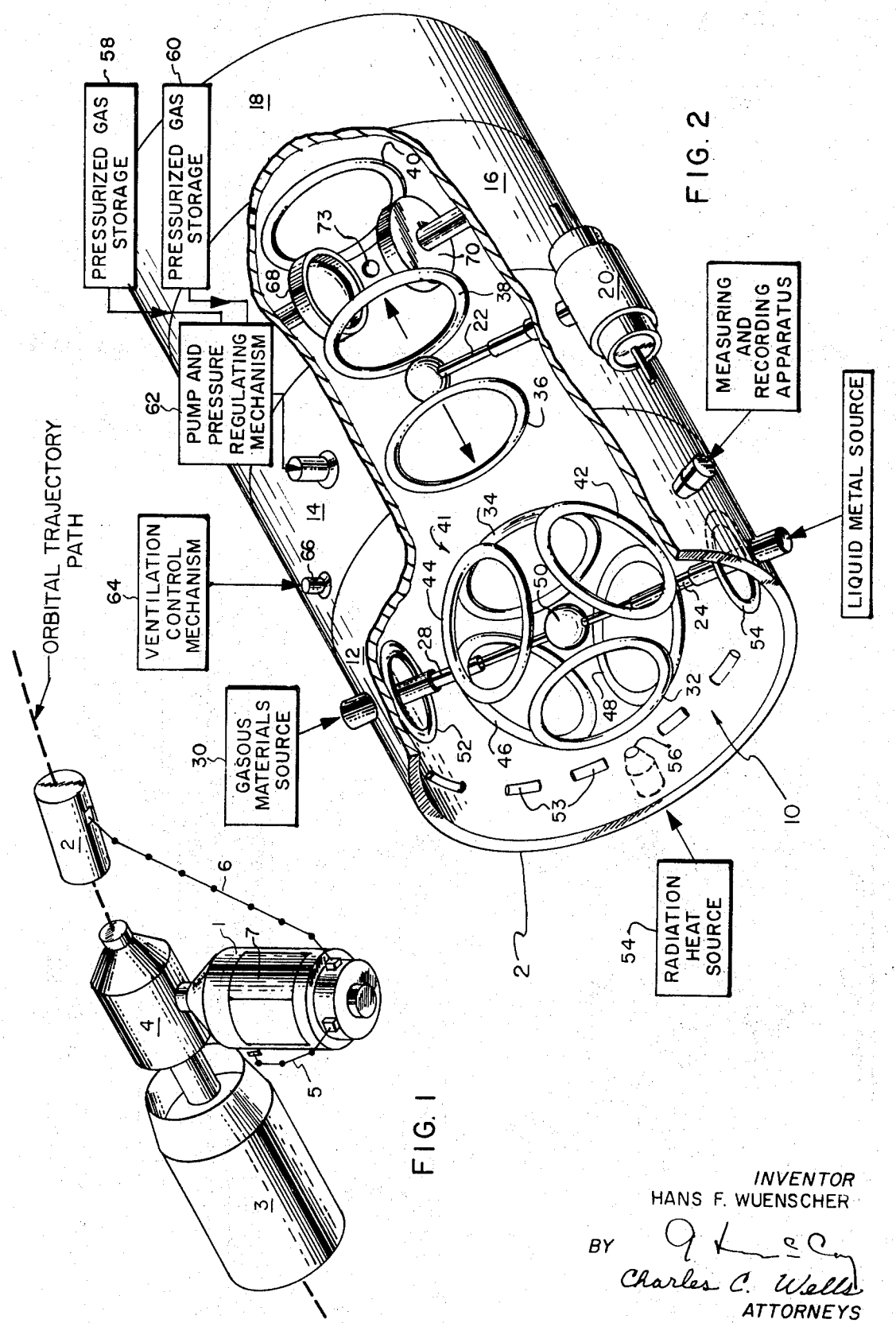

United States Patent Office 3,534,926
Patented Oct. 20, 1970

3,534,926
SPACE MANUFACTURING MACHINE
Hans F. Wuenscher, Huntsville, Ala., assignor to the United States of America as represented by the Administrator of the National Aeronautics and Space Administration
Filed Apr. 28, 1969, Ser. No. 819,599
Int. Cl. B64g 1/00
U.S. Cl. 244—1                 8 Claims

ABSTRACT OF THE DISCLOSURE

An apparatus or machine utilized in the low and zero gravity environment of orbital space flight for various manufacturing operations. The apparatus includes a cylindrical tank-like capsule in which manufacturing operations are carried out. An environmental control system is provided for controlling the atmosphere and pressure within the capsule. High and low frequency coils along with electro-static field coils are mounted in the capsule for positioning, spinning, transporting and agitating materials being processed in the capsule. Heating means are included for melting materials being processed and various probes are provided for adding liquid or gaseous materials to the materials or workpieces being processed. A mixing apparatus is included for preparing and placing mixtures of materials in the capsule for processing. Various equipment is provided for melting, alloying, casting, molding, drawing, blowing and other material processing operations that are used in the manufacture of various articles and materials.

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention relates in general to methods and apparatus for carrying out manufacturing operations in a low or zero gravity environment. More particularly the invention is a machine to be utilized in orbital flight about the earth for performing manufacturing processes and making various articles of manufacture.

Considerable attention has been given to the possibility of carrying out various functions in the low and zero gravity environment of a space laboratory in orbit about the earth. Extensive study and experiment has been made to determine if various processes and manufacturing operations (welding, tube brazing and high energy cutting, for example) can be performed in a zero gravity environment. The reason for this being that such operations will be required for the maintenance and modification of orbital space laboratories. While manufacturing processes and operations of this type are necessary there are other important categories of manufacturing operations that can be undertaken in the zero gravity environment. There are processes and articles which can be fabricated, or performed, as the case may be, more readily in a zero gravity environment than on earth and then there are other processes and articles which can be made or practiced only in a zero gravity environment.

Processes such as vacuum melting, levitation melting, and vapor deposition are examples of processes which can be performed on earth, but can be better carried out in the vacuum of space mainly because of zero gravity, but also because space is very clean and of unlimited volume. There are articles, however, which have not yet been successfully fabricated in a terrestrial environment. An example of such an article would be hollow balls for ball bearings. Such ball bearings are being sought by the Air Force as a means for improving the operation of jet engines. It is believed that the use of hollow balls in ball bearings will reduce the mass inertia of ball bearings, facilitate compensation for temperature gradients in the balls and result in an overall increase in bearing life time. Such improvements would greatly increase the performance characteristics of jet engines presently available.

A comprehension of how significant the advances made possible by low and zero gravity processes may be, can be had by considering the advances made possible with the development of vacuum processes in the 17th century. Until then every process was carried out at or above one atmosphere pressure. The development of vacuum processes was actually delayed because of the Horror Vacui philosophy of Middle Age clerical philosophers that a vacuum cannot exist because nature is afraid of an absolutely empty space. Scientists like Galileo and Kepler were convinced that vacuum exists in space and also that Toricelli's mercury barometer contained a true vacuum above the mercury. After Galileo's trial and punishment, vacuum research was continued in secrecy until the story of the Madgdeburg hemisphere (1650) proved publicly the existence of a vacuum. Mr. Papin could then invent the atmospheric engine and put the weight of the atmosphere to work by producing a vacuum behind a piston. This opened the door for the invention of the steam engine and the vacuum tube. The discovery of the vacuum or rather of the fact that it was possible to escape the ocean of air around the earth belongs to the group of history changing events. On the other hand, there could still be some validity in the old "Horror Vacui" philosophy if one considers that even a vacuum is not a space with nothing in it, because there is still gravity present and it is impossible to eliminate gravity and at the same time belong to our universe. If there is no possible escape from our immersion in the ocean of gravity, then how about zero "G" in orbit?

While forces of gravity can be counterbalanced and a zero-gravity situation created for very short time periods in drop towers where acceleration forces on a falling capsule are controlled so as to exactly offset the effects of gravity; it is only in an orbiting body that prolonged zero-gravity can be obtained. In an orbiting body, the orbital trajectory line of the center of gravity of the orbiting body is the locus of a curve where the zero gravity anomally occurs. For practical engineering purposes, in a space laboratory the space around this free fall trajectory line is under zero-gravity conditions, but it should be remembered that this is not absolutely exact and that there will be some gravitational effects on objects and processes being carried out only a few feet from the orbital trajectory line of the space laboratory. However, these forces are very small compared to terrestrial gravitational forces and can be dealt with effectively with electric field forces.

It should also be noted that there are manufacturing processes of very short processing cycle time that use a low "G" environment. An example is the free fall casting of lead shot which was utilized centuries ago by pouring liquid lead through a screen atop a shot tower. Droplets of liquid lead are formed when molten lead is passed through a screen and these droplets, due to their surface tension, assume the form of spheres and solidify during their descent through the shot tower.

Another example is the conversion of metals and non-metals to powders by atomizing a liquid form of the metal or nonmetal which solidifies to form a powder while falling. However, it is not possible to reach true equilibrium conditions in a process until the free fall uration has been extended to a considerable length of time, as in orbit where an orbiting laboratory is consistently free falling around the earth.

Consider the fact that it is not possible to effectively form a mixture of sand and water on earth because gravity will cause the sand to settle out. This is true of any mixture of solid particles in a liquid. The solid particles will either sink or float in the liquid, depending upon their relative densities. In a zero gravity environment this tendency to separate does not occur.

Mixing of materials in the liquid phase by convection currents (thermal eddies) does not occur in zero-G and this means that irregular heating or cooling patterns will not disturb equilibrium conditions in a process or manufacturing operation carried out in zero-G.

The molecular forces of cohesion and adhesion, which demonstrate themselves in liquids as surface tension and capillary action, are significant in a zero gravity environment. A molten metal liquid will assume the shape of a perfect sphere and such liquid when placed inside or outside of a solid mold will, due to capillary action and the absence of gravity forces, spread or float itself over the surface of the mold. The adhesion forces in a liquid in zero-G can also be utilized to attach the liquid to solid tooling and by the use of an expanding framework, or moving arms, very thin membranes and other objects can be drawn.

Very thin walled hollow spheres can be formed in zero-G by injecting gas into a sphere of molten liquid to form a gas pocket and then lowering the ambient pressure to greatly enlarge the size of the gas pocket to in effect form a thin walled bubble. The bubble is stable and can be formed so as to have a wall thickness of only a few molecular layers. This is possible because there is no tendency for the liquid in the walls of the bubble to drain down, like in a gravity environment, and become so heavy as to overcome the surface tension of the bubble wall and result in bursting of the bubble. This technique will work however, only on thin wall spheres. The production of thick wall spheres is complicated in that the concentricity of the gas bubble or pocket inside a thick walled sphere is not controllable by merely reducing ambient pressure so as to expand the inner pocket of gas and stretch the bubble walls.

SUMMARY OF THE INVENTION

The invention is a machine or apparatus that includes a capsule illustrated as a cylindrical tank forming an enclosure or area in which various manufacturing operations on a workpiece or materials are carried out. The workpiece can include a number of different materials, in either a liquid, solid or gaseous state or combinations thereof. The capsule would normally be fabricated from a series of cylindrically shaped modules or segments assembled to form a machine capable of performing various manufacturing operations. It is contemplated that modules can be added to or deleted from the apparatus to increase or alter its capabilities as desired. The apparatus can be positioned either outside or inside an orbiting space laboratory and can be attached to or separated from the laboratory. A mechanical connection of the apparatus to a space laboratory can be made by using a jointed manipulator arm like that disclosed in U.S. patent application Ser. No. 769,665. By using such a manipulator arm, termed a "Septenuator" in the referenced patent application, the apparatus can be positioned as desired around a space laboratory or the connection can be broken in order to achieve a free flying condition during operations. The space manufacturing machine would then perform as an independent satellite.

Supporting equipment for the machine may be mounted outside the capsule. Such equipment would include containers or bottles for processing gases utilized to provide a particular atmosphere and pressure in the capsule. The gas bottles are connected to the interior of the capsule through a regulating mechanism that functions to pressurize the capsule interior and retrieve the gases for reuse if desired. A ventilating mechanism exhausts gases to surrounding space and communicates the hard vacuum of space to the interior of the capsule for degassing of materials being processed within the capsule.

Various coils are arranged within the capsule and these coils are shown only schematically for ease of illustration. A suitable power source, and electrical connections between the power source and coils, has not been shown since such components and the manner in which such components are connected and used are well known.

High frequency transportation coils are positioned within the capsule so that the center of each coil coincides with the longitudinal axis of the capsule. The high frequency coils develop an electric field that moves a workpiece along the axis of the tank to a desired work station; and, after processing, to an airlock or the like for removal.

One of the work stations is a main work-station and this work-station includes four high frequency coils positioned around the longitudinal axis of the tank, and between two of the spaced high frequency coils, to form a group of six coils which can be selectively energized so as to exert a desired force on a workpiece positioned in the center of the group. The coils could accomplish, for example, spinning of the workpiece. In this same vicinity a pair of low frequency coils are mounted that generate low frequency electric fields that results in slower acting forces which will agitate a workpiece. Also, positioned in this same vicinity near the main work-station are a number of DC field coils mounted around the periphery of the work station that generate an electrostatic field for forming a workpiece after melting into various complex configurations. Such forming can be precisely controlled and repeatability is good.

A heat source, positioned either inside or outside of the capsule, is mounted in the vicinity of the main work-station so that the output of the heat source can be used for the heating and/or melting of materials positioned in the main work station. Cooling of materials being processed in the apparatus is achieved by radiation of heat away from the material to the outside wall of the capsule. Heat transferred to the wall can be dissipated by a regenerative cooling system in the capsule wall or by radiation ribs on the wall (not shown).

Various probes and other instruments for providing gaseous or liquid materials within the capsule are included, along with measuring and recording apparatus for monitoring of the process. The apparatus would include airlocks (not shown) that comprise a multiple arrangement of chambers and doors to permit a workpiece to be placed in or removed from the capsule without bringing the interior of the capsule to ambient pressure or loss of processing gases within the capsule.

BRIEF DESCRIPTION OF THE DRAWINGS

FIG. 1 is a pictorial illustration of a space station that includes a manufacturing capsule.

FIG. 2 is a pictorial view, partially in section, of a capsule for carrying out space manufacturing operations.

FIG. 3 is an end view looking into the left end of the capsule of FIG. 2.

FIG. 4 is a view in cross-section along lines 4—4 of FIG. 3.

FIG. 5 illustrates a molding apparatus for use in the capsule.

FIG. 6 is an apparatus for applying coatings to a workpiece.

FIG. 7 illustrates a drawing device for forming filaments.

FIG. 8 illustrates an apparatus for drawing membranes.

FIG. 9 illustrates a device for precisely measuring materials.

DETAILED DESCRIPTION OF THE INVENTION

Referring to FIG. 1 which is a pictorial representation of how a space manufacturing machine could be deployed. It is contemplated that structure 1 would house a machine or capsule like capsule 2 or alternatively the capsule could be used as shown in FIG. 2 without a surrounding structure. Structure 1 is connected to a space laboratory 3 by means of a multiple docking adapter 4 which would accommodate several structures if desired. A pair of Serpentuators or manipulator arms 5 and 6 are mounted at one end of structure 1.

These Serpentuators could serve multiple functions, one being to insert and remove capsule 2 from structure 1 via doors 7. Also the Serpentuator could be employed to position either capsule 2, or even structure 1 if desired, along the free fall trajectory line of the space laboratory. The module in which manufacturing operations are to be carried out could be positioned some distance away from the main space laboratory and the mechanical connection between them maintained by keeping the Serpentuator connected. The connection could be broken and the capsule left in a freely suspended condition for a desired time interval. The advantage of this is that the process being carried out is located closer to the free fall trajectory of the space station which is where the zero-gravity anomaly occurs. In the case of the freely suspended capsule the free fall trajectory line would be that line followed by the capsule center of gravity since when orbiting in a freed condition the capsule is in effect an independent satellite. In this free mode of operation the relative positions of the capsule and space laboratory would change very slowly and when retrieval is desired the capsule could be recaptured with a Serpentuator.

A Serpentuator in effect performs for a machine in space what a floor does in a terrestrial environment. A floor supports and locates a machine relative to other equipment. Support is not necessary in zero-gravity, but position is and this can be accomplished by a Serpentuator. Furthermore, a suitable Serpentuator could be employed to spin a space manufacturing machine about its center and generate centrifugal forces that would cause separation of liquids and gases being processed within the capsule. This would permit the removal of undesired gases from a liquid workpiece.

Referring now to FIG. 2 which illustrates a space manufacturing machine that includes a processing chamber 10 defined by casing or capsule 2 composed of a number of annular segments 12, 14, 16 and 18. The segments are fastened together by welding, bolting or other suitable means. The casing in addition to defining a processing chamber also provides a means of positioning various pieces of equipment and tooling for carrying out manufacturing operations like heating, cooling, shaping, etc. within the capsule. The capacities and capabilities of the machine can be increased easily by adding additional segments to increase either the size or number of the processing areas. It should be understood that the capsule can be shaped other than cylindrical and that intersecting processing chambers separated by airlocks may be employed in more sophisticated future machines. The ends of the capsule are closed by airlocks (not shown) and access openings (not shown) are provided along the chamber wall as needed.

Materials to be processed within the capsule are handled in various ways. Solids other than powders can be inserted manually into the capsule through access openings. Powders, liquids and gases however require special handling. A mixing device 20 like that described in copending U.S. patent application Ser. No. 769,665 is resiliently mounted to the outer wall of the capsule and is in communication with the interior of the capsule via tube 22. Since weight is not a factor in zero-G, mountings are not required to be strong and the purpose of such a mounting is primarily to position the mixing device. Tube 22 can be deployed and retracted so as to position various mixtures of materials dispensed by device 20 (including homogeneous mixtures of powders, gases and liquids) in the center of the capsule. In zero-G the mixture dispensed through tube 22 will form a sphere due to surface tension in the liquid components of the mixture and this sphere will adhere to the tube and move with it unless some external force is exerted to actually remove the sphere from the tube. The manner in which removal of the sphere is accomplished will be discussed hereafter. Device 20 includes a chamber wherein various materials can be placed and thereafter heated so that at least one of the materials is changed to a liquid or plastic state. The material would then be mixed in the chamber and later expelled from the chamber into the capsule through tube 22. The details as to operation of device 20 and the manner of supplying materials thereto is described in the above referenced copending U.S. patent application Ser. No. 769,665.

Additional liquid materials can be supplied to a workpiece by retractable probe 24 connected to a source 26 of liquid materials positioned outside the capsule. Likewise gaseous materials can be supplied to the workpiece by another retractable probe 28 connected to a source 30 of gaseous materials mounted outside the capsule.

It is necessary that materials placed in the capsule for processing be moved about to selected locations in the capsule and this is accomplished by a series of high frequency coils 32, 34, 36, 38 and 40 mounted in spaced relation along the longitudinal axis of the capsule. The coils are connected to a source of high frequency electrical power through suitable connections. The supports or mountings, as well as electrical connections and power source for the high frequency coils, as well as other coils discussed hereafter, are not shown so as to simplify illustration. This manner of illustration is deemed appropriate in view of the fact that various types of known power sources are available for such use. Such sources of electrical power would include fuel cells, arrays of solar cells in combination with storage batteries, and inverters capable of converting direct current to an alternating current of desired frequency.

The high frequency coils generate a force field that centers a workpiece in the coils and tends to move the workpiece in one direction or the other along the longitudinal axis of the capsule, depending upon the direction of current flow through the coils. Due to this force exerted by the coils, a workpiece in the shape of a sphere formed from materials dispensed by tube 22 can be moved away from the tube toward, for example, the left end of the capsule to what is termed a main work station 41 formed by a group of electrical coils discussed in detail hereafter.

At the left end of the capsule four additional high frequency coils 42, 44, 46 and 48 are positioned around the longitudinal axis of the capsule between coils 32 and 34 so as to form a group of six high frequency coils. Each of the coils lie in a plane that is perpendicular to the plane of four of the nearest adjacent coils and parallel to the plane of one coil. For example, the plane of coil 42 is normal to the planes of coils 32, 34, 44 and 48 and parallel to the plane of coil 46. Coil positioning is shown in FIGS. 3 and 4. By selectively energizing the coils making up the group of six coils, desired forces and motions can be imparted to a workpiece. Metal sphere 50, for example, could be set to spinning and, if brought to a liquid state by melting, shaped into an intricate pattern with very precise tolerances.

A pair of low frequency coils 52 and 54 are positioned adjacent the group of six high frequency coils. The function of the low frequency coils is to generate fields of force which change less rapidly and therefore generate slower acting forces for manipulating a workpiece to cause physical changes that require longer time periods than that provided by high frequency coils. An example of such physical change would be the blending of two or more molten materials making up a sphere positioned in the main work station. A rapidly reversing force field like that produced by high frequency coils would only affect the outer portions of a sphere of molten material whereas low frequency forces will agitate the entire molten sphere.

A number of DC field coils 53 are mounted around the periphery of the main work station. These coils generate field forces for shaping a workpiece of liquid materials to a particular configuration. Current flow in coils 53 can be selected to generate controlled force fields for precise forming of a particular configuration or shape. For example, lenticular or other irregular shapes of equilibrium are generated when the electrostatic forces and the molecular forces present in a liquid (cohesive and surface tension forces) act in combination on a liquified material.

A radiation heat source 54 is mounted adjacent the capsule and energy generated by the heat source is directed through an aperture 56 in the capsule wall to workpiece 50. The function of the heat source is to heat or melt the workpiece. Various types of applicable energy sources that could provide the desired heat are: focused light from solar mirrors, radiation from heating elements in the capsule, electric arc, electron beam, plasma arc beam and laser beam.

A system for controlling the atmosphere within the capsule includes tanks 58 and 60 in which gas of a desired composition and pressure is stored. The gas in the tanks is selectively admitted to the capsule through a pump and pressure regulating mechanism 62. Mechanism 62 also functions to retrieve gases from the capsule and return them to their respective storage tank after first subjecting the gases to filtering if necessary for removal of impurities accumulated during processing operations in the capsule. Mechanism 62 is a high capacity unit capable of rapidly changing the pressure and composition of the atmosphere in the capsule.

A ventilation control mechanism 64 is in communication with the interior of the capsule via conduit 66. Mechanism 64 serves the purpose of adequately venting the capsule to outer space so as to provide a hard vacuum in the capsule for degassing of a workpiece during a melting operation.

Segment 16 of the capsule is provided with a molding apparatus, see FIG. 5, having two mating halves 68 and 70. The mold halves are mounted on moveable shafts so that the mold halves can be brought to a closed position over a sphere of liquid material 69 to mold various objects. This molding apparatus would have particular application in the forming of objects from a super-cooled liquid material to produce new type glasses, semi-conductors and single crystal components.

Super-cooling of liquids occurs when the temperature of a liquid is lowered below that temperature where the liquid usually solidifies. It is difficult to achieve and maintain a liquid in a super-cooled state in a terrestrial environment because of solidification due to nucleation caused by thermal eddies present in a liquid undergoing a temperature change. Boundary layer effects between the liquid and the wall of its container also causes solidification. However, due to the absence of thermal eddies in zero-G, and the fact that a liquid will assume and retain the shape of a perfect sphere when suspended without a container, a high degree of super-cooling can be achieved in a zero-G environment. This has two consequences. First, much of the shrinkage in the material takes place in the liquid state and therefore less stress is induced in the material when solidification occurs. Secondly, the viscosity of the liquid increases with the lowering of temperature and prevents the start and propagation of crystallization. This could lead to amorphous solidification of otherwise crystallizing materials.

Closing the mold on a highly super-cooled liquid will cause almost instantaneous solidification and the objects formed in the mold would be free of the induced stresses that are inherent in objects molded in a terrestrial environment. Extremely fine grained metals could be produced that exhibit characteristics of extreme stretching, or so called "superplasticity." It may even be possible to mold single crystal objects of considerable size. Mono-crystalline materials have the characteristic of always being transparent. Therefore, if a highly super-cooled liquid metal, like steel, were amorphous when solidified, a transparent steel might result. Solidification of a super-cooled liquid can be brought about by producing a planned disturbance in the liquid. Such a disturbance results from closing the mold on the super-cooled material. The disturbance could also be generated by passing a very small and high speed projectile through the liquid.

The super-cooled material being molded is first heated to a liquid state by a heat source (like heat source 54) whose energy output is directed to the material being molded through an opening 73 in the capsule wall. Cooling by radiation heat loss occurs when the heat input is reduced. If desired, a more controlled cooling rate could be obtained by providing means for controlling the temperature of the capsule wall. The wall of the capsule could be provided with a cooling system (not shown) which might include a circulating coolant or fins or ribs to improve radiation heat transfer characteristics.

Objects can be fabricated in zero-G by adhesion casting. By this it is meant that the capillary forces present in liquids that causes spreading of the liquid over a surface is utilized to spread a liquid layer over either the inside or outside of a mold or form. Since there are no gravitational forces to consider, very uniform layers can be achieved. This is illustrated in FIG. 6 wherein liquid metal from tube 24 spreads itself in a layer 72 over sphere 74. Tube 24 would have to be constructed of a material that is non-wetting with respect to the liquid being dispersed therefrom. Otherwise the liquid would spread over the outside of the tube as well as the sphere. Very uniform coatings can be applied using this technique and objects having a shape other than spherical could be coated. Products like multilayer-coated isotopes and optical components could be fabricated. Another type of forming is made possible by utilizing the adhesive forces which present themselves when the surface of a liquid contacts a solid surface. For example, as shown in FIG. 7, a probe 76 when inserted into a mass 78 of molten material and then withdrawn, will have material clinging to the probe and a filament 80 of material will be drawn from liquid material 78. Very lengthy pieces could be drawn so long as material 78 is maintained in a liquid state and additional material is supplied through tube 82. Filament 80 would or could be cooled as it is drawn away from mass 78. One application of this technique would be to produce rolls of very small diameter wire in which variations in wire diameter are held to extremely close tolerances. Uniform wire diameters, which result in uniform electrical resistances, would be inherent in this technique so long as the drawing speed, temperature, and composition of the material were maintained constant. This technique does not require the use of a crucible for melting materials nor a forming or drawing die as does terrestrial wire forming. The crucible and dies are a source of impurities that result in non-uniform electrical properties and such impurities can be avoided using zero-gravity processing. It would of course be necessary to provide a mechanism for winding the wire onto spools, but this could be readily accomplished.

Very thin membranes can be drawn by utilizing an expanding framework 84 like that shown in FIG. 8. Framework 84 includes a stationary member 86 in contact with a supply of liquid material 88 dispensed by tube 90, and moveable member 92 that slides along track 94 away from member 86 when a force is applied to bar 96. Material to form membrane 98 is drawn from the mass of material 88. Membranes having a thickness of only a few molecular layers can be produced in this manner. Multi-layer membranes could be fabricated by subsequent pouring of liquids over a drawn membrane. The subsequently poured liquid materials would spread over the original membrane in layers. It is necessary that the poured liquids have the property of wetting against one another. Membranes drawn in this manner could be intricately shaped by blowing the membrane over a mold (not shown) and then subjecting each side of the membrane to different pressures so that the membrane will conform to the shape of the mold. Membranes fabricated in this manner would have application in various types of chemical and filtering processes.

Some zero-gravity processes require the use of a very precise quantity of material. Examples would be providing precisely measured materials for a molding apparatus like that shown in FIG. 5; and material for a coating operation or a very precise amount of material to be made into a ball, either hollow or solid, for a ball bearing. It is not possible to achieve accurate material quantities in zero-gravity environment using conventional weighing techniques since the material being measured has no weight.

The apparatus shown in FIG. 9 provides a method whereby a desired quantity or dose of material can be measured out. The apparatus includes a dipper 100 having one enlarged end portion 102 and another end 104 pivotally or slidably mounted on structure 106. Structure 106 could be the wall of the capsule or some member extending therefrom. End 102 of the dipper has a coil 108 embedded therein that generates an electric field thereabout when electric current flows through the coil.

The dipper is mounted in the capsule such that end 102 thereof can be dipped into a mass of liquid and/or powdered material 110 positioned along the longitudinal axis of the capsule and then withdrawn. When withdrawn material 112 from mass 110 will adhere to end 102 due to the molecular forces of adhesion and cohesion; provided that is, end 102 is wettable with respect to material 110. If non-wettable no material would be withdrawn, however material could be made to cling to the dipper by energizing coil 108. If the material were non-wetting as to the sting then the coil would entirely control the amount of material withdrawn. In withdrawing material from mass 110 it is necessary to move the dipper rapidly enough to overcome the adhesion due to surface tension effects between the material clinging to the dipper and that of mass 110. Mass 110 is held stationary during this operation by the action of the high frequency transportation coils. Later the material clinging to the dipper is stripped away by forces generated by the high frequency transportation coils. By utilizing the dipper, either with or without a coil embedded therein, very precise quantities of material can be measured out.

A very important application of zero-G processing is the manufacture of hollow metal spheres for use as ball bearings and the like. Such spheres are made by blow casting, i.e., injecting gas into the center of a mass of molten metal to form in effect a metal bubble. Bubbles are not stable in the gravity field of the earth because free liquid between the inner and outer layers of the bubble wall drains down to the bottom of the bubble. When the weight of the liquid in the bottom portion of the bubble becomes greater than the surface tension forces in the upper wall of the bubble the upper wall will separate. If the free liquid has drained down so that only the liquid molecules which are arranged in the surface tension layers of the wall remain in the upper portion of the bubble, a condition exists which will result in fracture of the upper bubble wall because there are no free molecules of liquid available to move in and fill the void created when the upper wall of the bubble separated.

In a zero-G environment this draining of liquids from the upper bubble wall does not take place. For this reason stability is provided and changes in surface tension area or size of the bubble during the blowing processes can be accomplished. The blowing of liquid materials has application, as mentioned above, in the production of hollow spherical bodies and such bodies can be produced by two methods utilizing the space manufacturing machine described herein.

A hollow sphere can be produced by expansion of an existing gas pocket in a liquidified metal ingot; expansion being accomplished by lowering ambient pressure. In the case of a previously prepared ingot having an inner gas pocket, the ingot would be placed in the machine and transported by the high frequency transportation coils to the main work station where it would occupy the position of workpiece 50. The ingot would be brought to a molten state by heat source 54. The pressure within the capsule would then be reduced to a desired level by pressure regulating mechanism 62 or by ventilation control mechanism 64. The size of the hollow sphere formed is determined by the size of the original gas pocket and by the amount of ambient pressure reduction.

Another technique for forming hollow spheres is by injecting gas from a probe or blowpipe, like retractable probe 28 connected to a source of gas 30 under pressure, into the center of a liquid metal sphere positioned in the place of workpiece 50. Gas can be injected until a desired sphere size is obtained or sphere size can be further increased after limited gas injection by lowering the ambient pressure as discussed above.

Hollow spheres so fabricated can be made to have extremely thin walls of perhaps as little as three molecular layers. However, the production of thick walled spheres by these methods has a severe deficiency in that the concentricity of the original gas pocket in the sphere is not controllable by either of the methods discussed above when the finished hollow sphere is to have substantial wall thickness.

The means of eliminating the excentricity between the inner and outer walls of a thick walled sphere lies in the application of acceleration forces to the material mass making up the wall of the sphere. Acceleration of the wall mass generates a hydraulic pressure which causes the thicker portions of the wall to run into the thinner portions of the wall until the sphere has a uniform wall thickness. This can be readily understood by making an analogy to the leveling of liquid surfaces in a gravity environment. When the liquid surface of a body of water is locally elevated, like in the case of a water wave, the wave produces a locally higher hydrostatic pressure at a certain level in the water than the hydrostatic pressure at the same level in the water under an adjacent valley or trough in the water. This causes lateral flow of the water from the wave to the trough and eventually results in a level liquid surface.

The mass of material making up the wall of a thick wall sphere can be subjected to radial, angular, or translatory acceleration over three axes or in three planes perpendicular to each other to generate forces which will cause the walls of the sphere to be uniform in thickness. Radial acceleration is applied by rapid cycling of pressure in the capsule by pump and pressure regulating mechanism 62 to expand and compress the hollow sphere. The mass of material making up the wall will be moved in and out during this pressure cycling and this movement will generate forces that cause the wall to become uniform in thickness. Augular acceleration forces can be applied by selectively energizing the six high frequency coils at the main work station so as to spin a sphere positioned in the place of workpiece 50. Translatory acceleration is applied in a similar manner by energizing the six coils in a manner to cause the sphere to move, up and down, back and forward, and right and left until equal wall thickness in the sphere is achieved.

This completes the detailed description of the invention and while various types of equipment for use in a zero-gravity manufacturing machine have been mentioned there are other types of equipment which could be used in such a machine.

What is claimed is:

1. A space manufacturing machine for performing various manufacturing operations and processes in a zero-gravity environment comprising:

a capsule that provides an enclosed chamber for carrying out manufacturing operations, a material dispensing means mounted on said capsule for dispening materials into said capsule to form a workpiece on which manufacturing operations are carried out therein, a plurality of spaced high frequency transportation coils mounted in said capsule for generating force fields when energized that move the workpiece to a desired position in said capsule, pump and pressure regulating means connected to said capsule and to gas storage containers positioned in the vicinity of said capsule for transferring gases between the interior of the capsule and the gas storage containers to control the atmosphere within said capsule, a ventilating mechanism connected to the interior of said capsule for communicating the interior of said capsule to the hard vacuum of space and thereby provide an evacuated chamber, a plurality of high frequency coils mounted in said capsule in a spaced position around and between two of the spaced transportation coils, whereby a set of coils is provided that forms a main work station to which a workpiece can be transported and while positioned in the work station various motions can be imparted to the workpiece by electric field forces generated by selective energization of the coils making up the set of coils, a plurality of low frequency coils mounted in said capsule adjacent the set of high frequency coils forming the main work station, said low frequency coils when energized generating electric field forces that act upon a workpiece positioned in the main work station, a plurality of spaced DC field coils mounted in said capsule around the main work station which when energized generate electric field forces that act on a workpiece, and a heat source mounted on said capsule and adapted to have its output directed at a workpiece positioned in the main work station for heating and melting of the workpiece.

2. A space manufacturing machine as recited in claim 1 which further includes molding means mounted in said capsule for shaping liquid materials into a desired configuration.

3. The space manufacturing machine recited in claim 2 wherein said molding means includes two mold halves adapted to be closed over a mass of super-cooled liquid material positioned in the center of said capsule.

4. A space manufacturing machine as recited in claim 1 which further includes, a material dispensing device mounted on said capsule and extendable into the capsule for dispensing materials to be used in manufacturing operations carried on in the capsule.

5. A space manufacturing machine as recited in claim 4 which further includes:

a gas dispensing device and a liquid dispensing device mounted on said capsule and extendable into the center of the main work station for dispensing liquids and gases to be used in manufacturing operations carried on in the capsule.

6. A space manufacturing machine as recited in claim 5 which further includes:

an apparatus for drawing a filament from a liquid material comprising an extensible probe adapted to be inserted into the liquid material and then withdrawn, whereby material will adhere to said probe and a filament will be drawn out of the liquid material.

7. A space manufacturing machine as recited in claim 1 which further includes an apparatus for measuring out precise quantities of a liquid material comprising:

a dipper mounted in said capsule and adapted to be dipped into a mass of liquid material and withdrawn with material from the mass of liquid clinging to the dipper, whereby the material clinging to said dipper can be stripped off by the action of said high frequency coils to provide a measured quantity of material.

8. The space manufacturing machine recited in claim 7 wherein said dipper has an electric coil embedded therein that generates an electric field when engerized to control the quantity of material that will cling to said dipper.

References Cited

UNITED STATES PATENTS 3,210,026 10/1965 Frisch.
3,300,162 1/1967 Maynard et al.
3,478,986 11/1969 Fogarty.

OTHER REFERENCES

R. J. Schwinghamer: Magnetic Forming in Space, Astronautics, September 1962, pp. 63–67.

Burkhalter & White: New Tools for the Inquisitive Mind—The Industrial Research Laboratory in Space, Advances in Astronautical Sciences, vol. 23, 1968, pp. 211–219.

Kirkland and Gervais: Design of a Commercial Space Station, Advances in Astronautical Sciences, vol. 23, 1968, pp. 220–221.

TRYGVE M. BLIX, Primary Examiner

J. L. FORMAN, Assistant Examiner